United States Patent [19]

Hasenbeck

[11] Patent Number: 4,488,568
[45] Date of Patent: Dec. 18, 1984

[54] RAIN DETECTOR FOR IRRIGATION CONTROL

[76] Inventor: Harold W. Hasenbeck, 1524 Alameda St., Pomona, Calif. 91768

[21] Appl. No.: 387,783

[22] Filed: Jun. 14, 1982

[51] Int. Cl.³ .............................................. F16K 17/36
[52] U.S. Cl. ..................................... 137/78.2; 239/63; 324/65 R
[58] Field of Search ............... 137/78.2, 78.3; 239/63; 324/65 R

[56] References Cited

U.S. PATENT DOCUMENTS

| | | | |
|---|---|---|---|
| 3,224,676 | 12/1965 | Rauchwerger | 137/78.2 |
| 3,500,844 | 3/1970 | Sonner | 137/78.2 |
| 3,553,481 | 1/1971 | Hasenbeck | 239/63 |
| 3,847,351 | 11/1974 | Hasenbeck | 239/63 |
| 3,915,185 | 10/1975 | Sonner | 137/78.3 |
| 4,130,382 | 12/1978 | Bode | 137/78.2 |
| 4,137,931 | 2/1979 | Hasenbeck | 137/78 |
| 4,216,789 | 8/1980 | Hasenbeck | 239/63 |

Primary Examiner—A. Michael Chambers
Attorney, Agent, or Firm—William W. Haefliger

[57] ABSTRACT

A rain sensor system for controlling irrigation comprises:
 (a) a heat diffusion sensor having a tip exposed to the atmosphere and characterized in that relatively higher heat loss created by collection of water adjacent the sensor reduces its electrical resistance, and relatively lower heat loss created by absence of such water collection increases the sensor electrical resistance, and
 (b) circuitry operatively connected with the sensor for controlling an actuator for an irrigation valve.

4 Claims, 4 Drawing Figures

U.S. Patent  Dec. 18, 1984  4,488,568
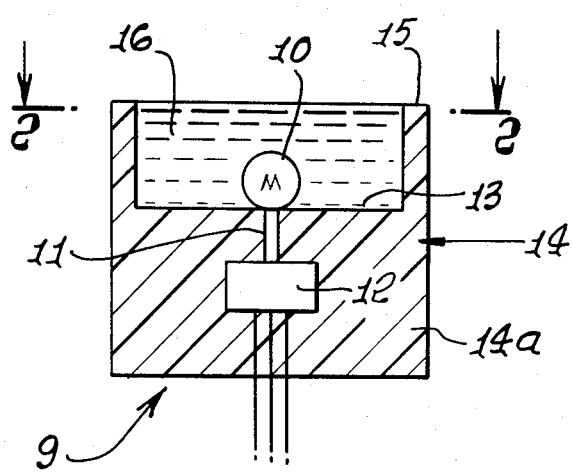
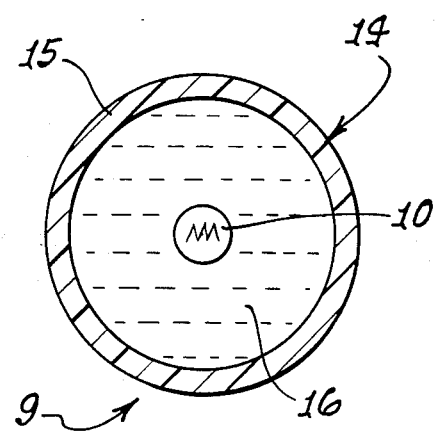
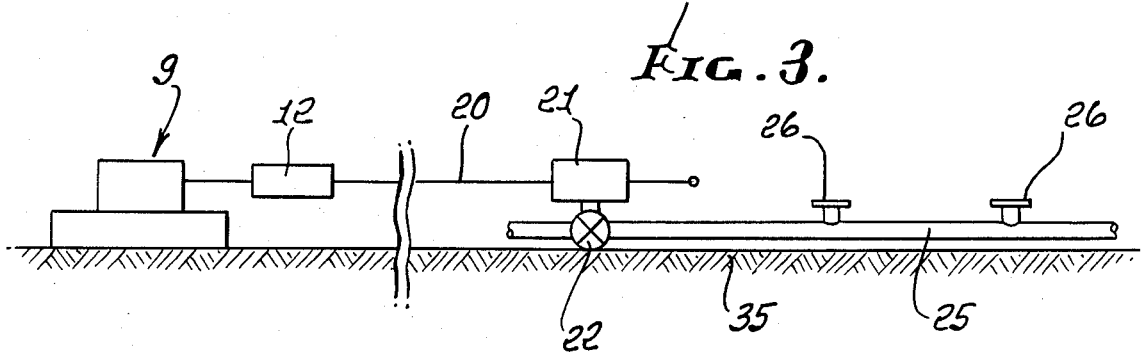
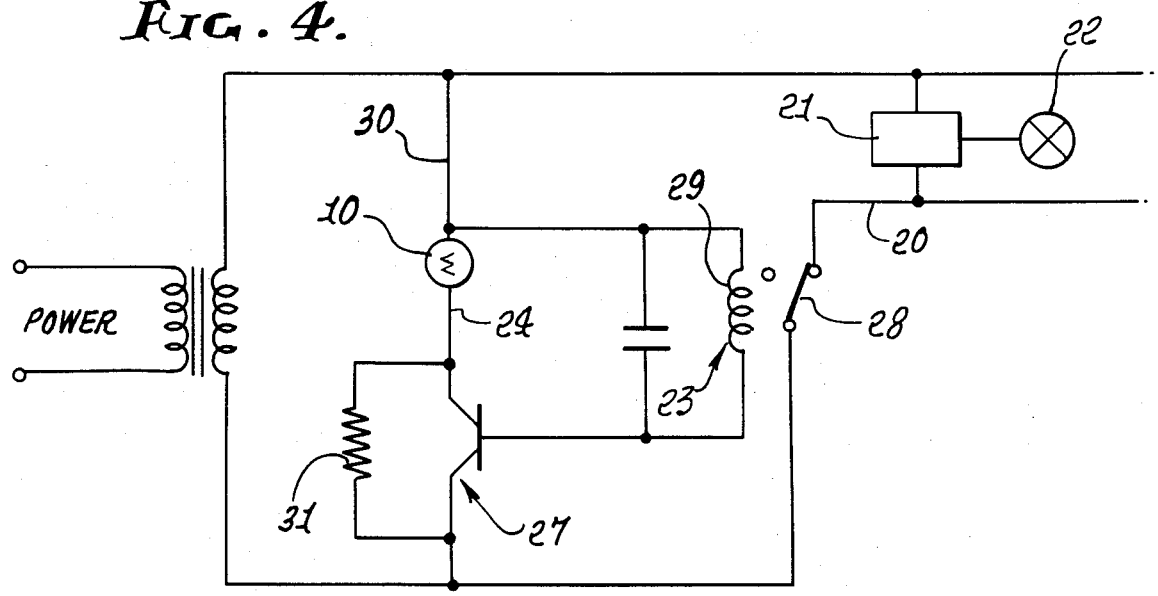

RAIN DETECTOR FOR IRRIGATION CONTROL

BACKGROUND OF THE INVENTION

This invention relates generally to irrigation control system, and more particularly the control of irrigation as a function of the presence or absence of rain water.

There is a need for simple apparatus which is directly sensitive to rain water. In particular, there is need for apparatus arranged to automatically switch the irrigation controller off at the on-set of rain to conserve stored irrigation water.

SUMMARY OF THE INVENTION

It is a major object of the invention to provide a device and system directly sensitive to rain water or a collection of rain water. Basically, the sensor system for controlling irrigation during rain comprises (a) a heat diffusion sensor having its tip exposed to the atmosphere and located within a water collection cup, the sensor element being characterized as having relatively low electrical resistance when cooled by water, and relatively high electrical resistance when dry. When an alternating voltage (28 volts AC for example) is applied across the sensor element, the current through the element varies as a function of its electrical resistance. The resistance change from wet to dry is typically greater than 10 to 1. If a low ohmage resistance of a selected value is wired in series with the sensor element, the voltage across the resistor will be high when the sensor is wet (cold) and low when the sensor is dry (hot). This voltage change can be used to trigger a solid state switch (SCR) to allow current to flow through a relay coil to actuate the relay contacts open, thereby to remove power from an irrigation valve. When the sensor element is dry, the resistance increases by a factor of five or more. This reduces the voltage across the SCR trigger resistor the point where the SCR becomes non-conductive, and the relay switches to the opposite contact point. This closes the common power lead to the various valves. Thus, power can be available to the various valves when selected by the irrigation controller.

As will appear, an irrigation valve actuator is typically connected with circuitry of the rain sensor to open the irrigation valve control circuit when the sensor (as for example thermistor) resistance decreases when cooled by rain water and to close the valve control circuit when the water evaporates and allows the thermistor to heat and increase resistance.

Further, in the absence of rain water collection or after evaporation from the collection zone, irrigation may be controlled by time switching.

These and other objects and advantages of the invention, as well as the details of an illustrative embodiment, will be more fully understood from the following specification and drawing, in which:

DRAWING DESCRIPTION

FIG. 1 is an elevation taken in section, showing one form of the invention;

FIG. 2 is a plan view taken on lines 2—2 of FIG. 1;

FIG. 3 is an elevation showing the FIG. 1 form of the invention installed in an irrigation system; and FIG. 4 is a circuit diagram.

DETAILED DESCRIPTION

In FIGS. 1 and 2, the water sensor comprises a heat diffusion sensor, as for example a thermistor 10 having leads 11 extending to control unit 12. The latter may include a source of electrical potential, the amount of current passed to the sensor 9 and returned, and via leads 11, dependng of course on the electrical resistance of the thermistor and which varies as a function of the rate of heat loss. Therefore, the output of the sensor 9 may be considered as varying as a function of changes in heat diffusion from (or to) the sensor.

The sensor has a tip exposed to the atmosphere, and characterized in that relatively higher heat loss created by collection of water (such as rain water) adjacent the sensor reduces its electrical resistance, and relatively lower heat loss (created by absence of such water collection) increases the sensor electrical resistance. In this regard, the sensor thermistor 10 is shown exposed above the upper surface 13 of water collector 14, which may consist of electrically insulative material, for example. As shown, the collector has a rim 15 surrounding the water collection zone 16 directly above surface 13, to define a tray within which the thermistor bead is exposed or projects upwardly above the level of collection surface 13. Unit 12 is within body 14a of collector 14. Water is shown in zone 16.

Also provided is circuitry operatively connected with the thermistor for controlling an irrigation valve actuator or actuators. FIG. 3 illustrates the provision of such circuitry in unit 12. The output 20 of unit 12 is connected to an actuator 21 for irrigation valve 22.

In FIG. 4, unit 12 may include a relay 23, actuated when current passed by lead 24 changes to a predetermined value, to thereby supply power to valve actuator 21, for opening valve 22. Water then flows in irrigation pipe 25 to sprinklers 26. Similarly, when rain water fills zone 16 as described above, as detected by thermistor 10, the resistance of the latter changes, to change the current in lead 24, and the valve 22 is closed.

The circuitry of FIG. 4 is also shown to include an SCR 27, and relay switch arm 28. Relay coil 29 is connected across the thermistor lead 30 and the SCR, as shown. SCR is activated when the voltage developed across R 31 reaches a pre-set turn-on level as controlled by the resistance of the thermistor.

The actuator 21 may incorporate a timer which is electrically actuated by current flow in lead 20 to turn valve 22 ON for a timed interval, and to turn valve 22 OFF for another interval, thereby to irrigate the soil 35 at predetermined intervals, in the absence of rain water collection in zone 16. No irrigation of the soil via sprinklers 26 occurs during the time for evaporation of water from zone 16 to a predetermined low level in zone 16.

I claim:

1. In a rain sensor system, for controlling irrigation, the combination comprising
   (a) a heat diffusion sensor comprising a thermistor having a tip exposed to the atmosphere and characterized in that relatively higher heat loss created by collection of water adjacent the sensor reduces its electrical resistance, and relatively lower heat loss created by absence of such water collection increases the sensor electrical resistance, and
   (b) circuitry means operatively connected with the sensor for controlling an actuator for an irrigation valve, (c) there being a water collector tray having an interior wherein the thermistor is exposed to water collecting in the tray to be cooled by such water, the tray located above ground, (d) said thermistor and circuitry means connected to initiate irrigation when water is absent from the tray, (e) the top of the thermistor located in the tray at a substantial distance below the top level of the tray and above but near (rear) bottom level of the tray interior, whereby water filling the tray must evaporate from the tray down to the level of the thermistor before the thermistor will initiate irrigation via the circuitry means to actuate said valve, (f) there being a body supporting the tray and in which said circuitry means is protectively located, whereby the body, tray and thermistor and circuitry means form a single unit.

2. The combination of claim 1 including said irrigation valve actuator connected with said circuitry means to operate the valve in one mode when the sensor electrical resistance increases and to operate the valve in a second mode when the sensor electrical resistance decreases.

3. The combination of claim 2 wherein said circuitry includes a relay connected with the valve actuator and controlled by the sensor in the form of a thermistor.

4. The combination of claim 2 including a timer to control opening and closing of the valve in the absence of rain water collection adjacent the sensor.

* * * * *